(12) United States Patent
Honda

(10) Patent No.: US 6,563,674 B1
(45) Date of Patent: May 13, 2003

(54) THIN-FILM MAGNETIC HEAD

(75) Inventor: Kenji Honda, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/471,850

(22) Filed: Dec. 23, 1999

(30) Foreign Application Priority Data

Dec. 24, 1998 (JP) .......................... 10-368039

(51) Int. Cl.⁷ .............................. G11B 5/17; G11B 5/60; G11B 15/64; G11B 17/32; G11B 21/20
(52) U.S. Cl. .................................. 360/234.5; 360/123
(58) Field of Search .............................. 360/110, 313, 360/317, 322, 123, 125, 126, 246.6, 234.3, 234.5, 230, 234, FOR 213

(56) References Cited

U.S. PATENT DOCUMENTS

| | | | | |
|---|---|---|---|---|
| 4,685,014 A | * | 8/1987 | Hanazono et al. | 360/126 |
| 5,001,591 A | * | 3/1991 | Nakashima | 360/126 |
| 5,675,459 A | | 10/1997 | Sato et al. | 360/325 |
| 5,751,522 A | | 5/1998 | Yamada et al. | 360/317 |
| 5,835,313 A | | 11/1998 | Sato et al. | 360/317 |
| 5,894,380 A | * | 4/1999 | Sasada et al. | 360/234.5 |
| 6,122,818 A | * | 9/2000 | Lee | 29/603.12 |

FOREIGN PATENT DOCUMENTS

| JP | 61-178712 | 8/1986 |
|---|---|---|
| JP | 04-109412 | 4/1992 |
| JP | 09-016910 | 1/1997 |

* cited by examiner

Primary Examiner—Hoa T. Nguyen
Assistant Examiner—Julie Anne Watko
(74) Attorney, Agent, or Firm—Brinks Hofer Gilson & Lione

(57) ABSTRACT

A pair of magnetic heads is provided with a magnetic disk for a magnetic writing/reading apparatus, and a thin-film magnetic head is provided in which forms of leads are easily changed and characteristics are stable. A pair of sliders 3a and 3b oppose each other with the magnetic disk therebetween, and connecting portions of the peripheral edges of coils Ca and Cb, and leads 6a1 and 6b1, are disposed at sides opposite to gaps for writing. Intermediate leads 8a and 8b are provided in which ends are connected to conductive layers Ea2 and Eb2 of MR elements, and the other ends are connected to leads 6a4 and 6b4 which are disposed in close proximity to the edges of the other conductive layers.

34 Claims, 10 Drawing Sheets

THIN-FILM MAGNETIC HEAD

BACKGROUND OF THE INVENTION

1. Field of the Invention

The present invention relates to thin-film magnetic heads used for magnetic writing/reading apparatuses and the like.

2. Description of the Related Art

FIGS. 5A and 5B are drawings illustrating a magnetic writing/reading apparatus using a conventional thin-film magnetic head. FIG. 5A is a cross-sectional view of a main portion of the magnetic writing/reading apparatus, and FIG. 5B is a perspective view of a slider. FIGS. 6 to 10 are schematic plan views of trailing side surfaces of the sliders used for conventional thin-film magnetic heads.

In a magnetic writing/reading apparatus such as a hard disk apparatus, a plurality of thin magnetic disks 51 are stacked in spaced relation to one another, and a pair of magnetic heads H facing each other are disposed over and under the magnetic disk 51 therebetween.

As shown in FIGS. 5A and 5B, the magnetic head H comprises a supporting member 52 composed of a leaf spring, a flexible printed circuit, or the like, and two sliders (an upper slider 53a and a lower slider 53b) mounted at the edges of the supporting member 52. Sliders 53a and 53b are composed of a ceramic material, such as aluminum titanium carbide ($Al_2O_3$.TiC). An example shown in FIG. 5B is a so-called "two-rail slider" (lower slider 53b) having a U-shape in cross-section. On trailing side surface Ta of slider 53a, there are provided head element 54a and four bonding pads 55a1 to 55a4 composed of thin films which work as connecting terminals to peripheral processing circuits (not shown). Similarity to the above, on trailing side surface Tb of slider 53b, there are provided head element 54b and four bonding pads 55b1 to 55b4 composed of thin films which work as connecting terminals to peripheral processing circuits (not shown).

Head elements 54a and 54b are so-called "combined thin-film magnetic heads" comprising magnetoresistive magnetic heads (hereinafter referred to as an MR head) for reading and inductive magnetic heads (hereinafter referred to as an inductive head) for writing laminated on the MR heads. In FIG. 6, the MR heads comprise MR elements (not shown) and conductive layers Ea1 and Ea2, connected to the two ends of one of the MR elements (not shown), and Eb1 and Eb2, connected to the two ends of the other MR element (not shown). Conductive layers at bonding pads 55a4 and 55b4 sides are designated Ea1 and Eb1, respectively. The inductive heads comprise flat helicoid coils Ca and Cb which are composed of a low resistance conductive material, such as nickel (Ni) or copper (Cu), and are covered by insulating layers (not shown).

In individual sliders 53a and 53b, four leads 56a1 to 56a4, and four leads 56b1 to 56b4 are composed of a low resistance conductive material, such as nickel (Ni) or copper (Cu), and are provided at head element 54a side on trailing side surface Ta and at head element 54b side on trailing side surface Tb, as shown in FIG. 6. An end of lead 56a1 is connected to the central edge of coil Ca through an upper connecting lead 57a which is provided on an insulating layer (not shown) so as to pass over coil Ca. An end of lead 56b1 is connected to the central edge of coil Cb through an upper connecting lead 57a which is provided on an insulating layer (not shown) so as to pass over coil Cb. Individual ends of leads 56a2 and 56b2 are connected to the peripheral edges of coils Ca and Cb. Coils Ca and Cb are located at bonding pads 55a4 and 55b4 sides, respectively. Individual ends of leads 56a3 and 56b3 are connected to conductive layers Ea1 and Eb1, which are located at the bonding pads 55a4 and 55b4 sides. Individual ends of leads 56a4 and 56b4 are connected to other conductive layers Ea2 and Eb2, through contact holes (not shown). The other ends of four leads 56a1 to 56a4 are connected to bonding pads 55a1 to 55a4 provided at the upper layers of the leads, and four leads 56b1 to 56b4 are connected to bonding pads 55b1 to 55b4 provided at the upper layers of the leads. Individual bonding pads 55a1 to 55a4, and 55b1 to 55b4, are provided with fine gold wires (not shown), and are connected to peripheral processing circuits (not shown). Signal currents for writing by the inductive heads are fed from bonding pads 55a1 and 55a2, and 55a1 and 55b2, and currents (sense currents) for reading by the magnet heads are fed from bonding pads 55a3 and 55a4, and 55b3 and 55b4.

A method for manufacturing a conventional thin-film magnetic head will be explained. On the MR heads formed on trailing side surfaces Ta of slider 53a and Tb of slider 53b, lower core layers (upper shield layers; not shown) composed of Ni—Fe based alloy (Permalloy), layers composed of a non-magnetic material (not shown), and first insulating layers (not shown) are formed, sequentially. Then, coils Ca and Cb composed of copper or the like are formed on the first insulating layers (not shown) by a method of photolithography and plating. In the same step mentioned above, leads 56a1 to 56a4, and 56b1 to 56b4, are formed on the same layers. Leads 56a1 and 56b1 are formed so as to be connected to the peripheral ends of the coil Ca and Cb at the sides thereof. Leads 56a3 and 56a4 are connected through contact holes (not shown) provided beforehand to two conductive layers Ea1 and Ea12 which are connected to one MR element, and leads 56b3 and 56b4 are connected through contact holes (not shown) provided beforehand to two conductive layers Eb1 and Eb2 which are connected to the other MR element. Individual ends of leads 56a2 and 56b2 are disposed at coils Ca and Cb sides, respectively.

Next, second insulating layers (not shown) are formed so as to cover coils Ca and Cb by a method of photolithography after coating an organic resinous material or the like thereon. Contact holes (not shown) leading to the central edges of coils Ca and Cb are provided in the second insulating layers. Then, upper core layers (not shown) are formed on the second insulating layers (not shown) by using Ni—Fe based alloy (Permalloy) or the like by a method of frame plating. In the same step mentioned above, individual ends of leads 56a1 and 56b1 are connected to central edges of coils Ca and Cb through contact holes (not shown), and upper connecting leads 57a and 57a are formed so as to pass over coils Ca and Cb. At the other ends of leads 56a1 to 56a4, and 56b1 to 56b4, bumps (not shown) are formed as connecting members with bonding pads 55a1 to 55a4, and 55a1 to 55b4, which are formed later so as to exceed heights of the upper core layers (not shown).

Next, protective layers (not shown) composed of alumina or the like are formed by sputtering so as to cover the upper layers of the upper core layers (not shown), leads 56a1 to 56a4, and leads 56b1 to 56b4. The protective layers are polished until parts of the bumps (not shown) thereunder are exposed, and then, gold bonding pads 55a1 to 55a4, and 55a1 to 55b4, are formed on the exposed bumps (not shown) by plating to complete sliders 53a and 53b. Sliders 53a and 53b are mounted at a supporting member 52 (not shown), then bonding pads 55a1 to 55a4, and 55a1 to 55b4, are connected through fine gold wires (not shown) or the like to flexible printed circuit boards (not shown) which are to be connected to processing circuits; thus, the magnetic head H can be obtained.

In order to write data efficiently on both sides of magnetic disk 51, the magnetic head H is provided with two kinds of sliders 53a and 53b as shown in FIG. 6, in which two head elements 54a and 54b facing each other are located at positions equivalent to each other. Generally, a "mirrored pattern" is employed for sliders 53a and 53b, in which forms of leads 56a1 to 56a4, and 56b1 to 56b4, winding directions of coil Ca and Cb, and the like are in symmetrical mirror-image relationships.

In conventional magnetic writing/reading apparatuses, such as a hard disk apparatus, writing signals and reading signals of individual magnetic heads H are separately processed by analog processing circuits connected to flexible printed circuits (not shown). At this stage, when polarities of individual electrodes of bonding pads 55a1 to 55a4, and 55a1 to 55b4, are not required to be considered, problems caused by employing the "mirrored pattern" in the two sliders 53a and 53b facing each other have not occurred.

Recently, in order to improve reliability of signal processing in the magnetic writing/reading apparatus, methods for processing signals from a plurality of magnetic heads by a single digital processing circuit are increasing in use instead of conventional methods for processing signals by a plurality of analog processing circuits connected to individual magnetic heads H. In addition, because of restrictions caused by connecting the digital processing circuits or the like, polarities of electrodes at bonding pads 55a1 to 55a4, and 55a1 to 55b4, are to be determined. Furthermore, when magnetic writing signals are written, directions of currents Iw for writing in coils Ca and Cb, and directions of currents Is for reading (sensing) which flow in the MR elements (not shown) through conductive layers Ea1 and Ea2, and through conductive layers Eb1 and Eb2, are required to be in the same directions in some cases.

Due to these recent requirements, when the conventional "mirrored pattern" is employed for sliders 53a and 53b, and for example, when the polarities of bonding pads 55a1 and 55a2, and 55b1 and 55b2, are determined to be asymmetrical as shown in FIG. 7 (only inductive heads are shown for simplicity), flow directions of currents Iw for writing to the magnetic disk 51 are opposite each other, so that reliability of signal processing cannot be improved.

A method for solving this problem is to change different winding directions of coils Ca and Cb, which are opposite each other due to the conventional "mirrored patterns", to the same winding directions of coils Ca and Cb by employing asymmetric forms, as shown in FIG. 8. By this method, directions of currents Iw for writing can be in the same directions. However, when the connecting point of the peripheral edge of coil Cb and lead 56b2 is at the bonding pad 55b4 side, the number of windings of coil Cb, that is, the total length of Cb, becomes different from that of coil Ca, so that characteristics, such as inductance, of coils Ca and Cb becomes different. Consequently, reliable signal processing cannot be realized.

When the number of windings of the two coils Ca and Cb, are arranged to be equal to each other, the connecting point of the peripheral edge of coil Cb and lead 56b2 is at the side opposite to bonding pad 55b4, so that the form of lead 56b2 must extend over a large area to ensure connection. However, by so extending the form, the total length of leads in upper slider 53a and in lower slider 53b differ from each other, so that divergences of signal intensity and synchronous characteristics occur due to resistance difference described above, and writing errors easily occur.

Sense current Is depends upon the direction of magnetization of the MR element (not shown). For example, when the direction of magnetization of the MR head is from left to right and the polarities of bonding pads 55a3 and 55a4, and 55b3 and 55b4, are determined to be asymmetric as shown in FIG. 10, since sense current Is must flow from left to right, that is, in the transverse direction of the track, forms of bonding pads 55b3 and 55b4 in lower slider 53b must be changed so as to extend. The reason for this is that since leads 56b3 and 56b4 are formed on the same layer, and leads 56b1 and 56b2 are present therebetween, leads 56b3 and 56b4 cannot be extended for the purpose of connection in practice. However, when bonding pads 55b3 and 55b4 are extended in a complicated manner, formation of the forms on trailing side surface Tb of fine slider 53a is complicated and difficult; in addition, the total wiring length of bonding pads 55b3 and 55b4, and leads 56b3 and 56b4 in lower slider 53b differs from that in upper slider 53a. Consequently, the resulting difference in wiring resistance causes divergences of signal intensity and the like between the two sliders 53a and 53b, so that errors easily occur.

As thus described, in order to satisfy requirements for desired directions of writing and reading currents, and requirements for desired polarities of currents flowing through bonding pads in a pair of magnetic heads, forms of leads and bonding pads in conventional thin-film magnetic heads have been arranged depending on winding directions of coils and directions of magnetization of MR elements. However, resistance differences generated by differences of wiring length results in insufficient processing performance for digital processing circuits. Moreover, when leads and bonding pads are formed to satisfy requirements for desired directions of writing and reading currents, and requirements for desired polarities of currents flowing through bonding pads, a number of mask patterns for lithography are required, thereby increasing cost.

SUMMARY OF THE INVENTION

Accordingly, in a pair of magnetic heads provided with a magnetic disk for a magnetic writing/reading apparatus, it is an object of the present invention to provide a thin-film magnetic head of which forms of leads are easily changed and characteristics are stable.

As a first solution for solving the problems described above, a thin-film magnetic head according to the present invention comprises an inductive magnetic head for writing having a lower core layer, a coil, and an upper core layer, a first lead connected to the central edge of the coil, and a second lead connected to the coil at the peripheral edge thereof disposed at the side opposite to a writing gap.

Accordingly, when the direction of the current for writing is changed, under the condition that polarities of bonding pads are defined, this can be achieved only by optionally changing a winding direction of the coil, so that leads connected to the coil can be disposed without complicated extension of the leads. Since the length of the coil is not changed, the characteristics, such as inductance, can be consistent, whereby performance in signal processing is ensured. Individual total wiring length of leads and bonding pads is not changed before and after changing a winding direction of the coil, and electrical resistances of individual wirings are equal to each other; therefore, performance of signal processing can be ensured and consistent signal intensity can be obtained. In addition, various requirements for polarities and flow directions of currents for writing can be easily achieved only by changing mask patterns for a photolithographic method used for formation of leads and bonding pads.

As a second solution, a thin-film magnetic head according to the present invention comprises a magnetoresistive magnetic head for reading having a magnetoresistive element, two conductive layers respectively connected to the two ends of the magnetoresistive element, an intermediate lead, an end thereof being connected to one of the conductive layers, the other end being disposed in close proximity to the other conductive layer so that a current flows between a first lead connected to the other end of the intermediate lead and a second lead connected to the other conductive layer.

Therefore, when the direction of the sense current is changed, under the condition that polarities of bonding pads are defined, the change can be achieved, after changing the direction of magnetization of the MR head, by exchanging the lead connected to the conductive layer with the other lead connected to the intermediate lead, without complicated extension of the individual leads. Individual total wiring lengths of leads and bonding pads are not changed before and after exchanging two leads, and electrical resistances of individual wirings are equal to each other, so that performance of signal processing can be ensured and consistent signal intensity can be obtained. In addition, various requirements for polarities and flow directions of sense currents can be easily achieved only by changing mask patterns for a photolithographic method used for formation of leads and bonding pads.

As a third solution, a thin-film magnetic head according to the present invention comprises a magnetoresistive magnetic head for reading having a magnetoresistive element, two conductive layers respectively connected to the two ends of the magnetoresistive element, an inductive magnetic head laminated above the magnetoresistive magnetic head for writing having a lower core layer, a coil, and an upper core layer, a first lead connected to the central edge of the coil, a second lead connected to the coil at the peripheral edge thereof disposed at the side opposite to a writing gap, an intermediate lead disposed on a layer not including the first lead and the second lead, an end thereof being connected to one of the conductive layers, the other end being disposed in close proximity to the other conductive layer, a third lead connected to the other end of the intermediate lead, and a fourth lead connected to the other conductive layer.

Consequently, when the direction of the current for writing is changed, under the condition that polarities of bonding pads are defined, the change can be achieved only by changing the winding direction of the coil, without complicated extension of the individual leads. In addition, when the sense current is changed, under the condition that polarities of bonding pads are defined, the change can be achieved only by connecting the third lead connected to the intermediate lead to the conductive layer, and by connecting the fourth lead connected to the conductive layer to the intermediate lead, without complicated extension of the individual leads. Since the intermediate leads are disposed on a layer not including individual leads, complicated extension of individual leads are not required. Individual total wiring lengths of leads and bonding pads are not changed before and after changing the winding direction of the coil and/or exchanging two leads, and electrical resistances of individual wirings are equal to each other, so that performance of signal processing can be ensured and consistent signal intensity can be obtained. In addition, various combination of, for example, the polarities and the flow direction of sense current, can be easily achieved only by changing mask patterns for a photolithographic method used for formation of leads and bonding pads.

As a fourth solution, a thin-film magnetic unit comprises a thin-film magnetic head according to the present invention, wherein a pair of thin-film magnetic heads faces each other so as to insert magnetic recording medium.

Hence, when the flow direction of the current for writing and/or the flow direction of sense current is changed, under the condition that polarities of bonding pads between two thin-film magnetic head are different, this can be achieved only by changing winding directions of one or two coils, and/or by exchanging a lead connected to the conductive layer and a lead connected to the intermediate lead. Individual total wiring lengths of leads and bonding pads are not changed before and after changing the winding direction of the coil and/or exchanging two leads, and electrical resistances of individual wirings are equal to each other, so that performance of signal processing can be ensured and consistent signal intensity can be obtained. In addition, various combination of, for example, the polarities and the flow direction of sense current, can be easily achieved only by changing mask patterns for a photolithographic method used for formation of leads and bonding pads.

DESCRIPTION OF THE PREFERRED EMBODIMENTS

Figure 1A:
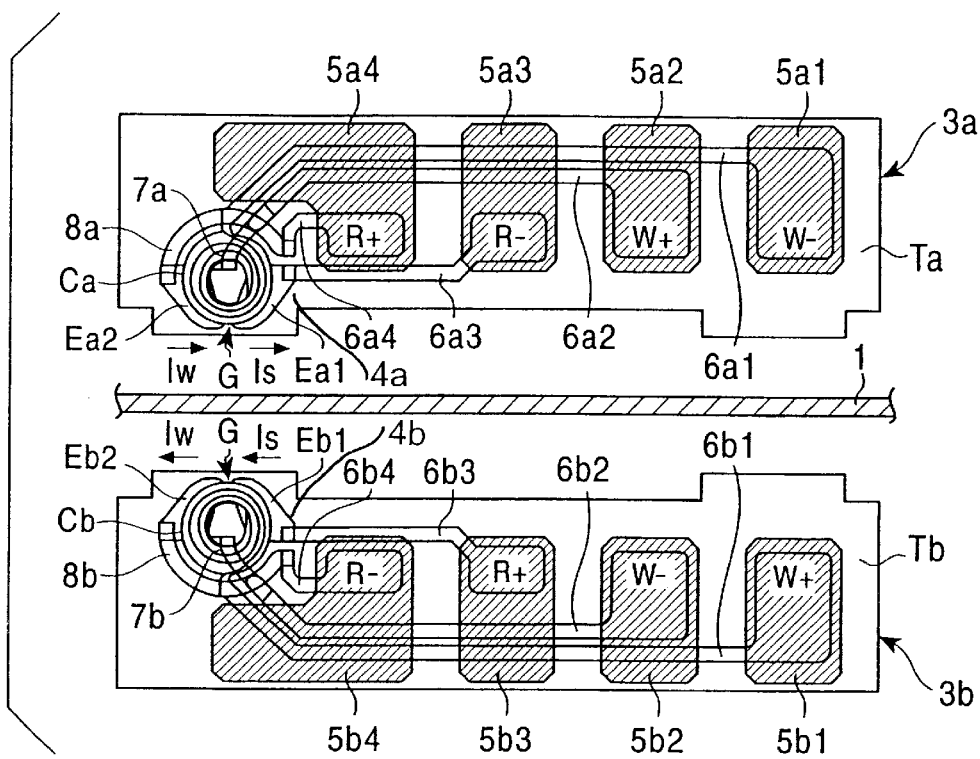
FIGS. 1A and 1B are schematic plan views of trailing side surfaces of two-rail type sliders used for a thin-film magnetic head according to the present invention.
Figure 1B:
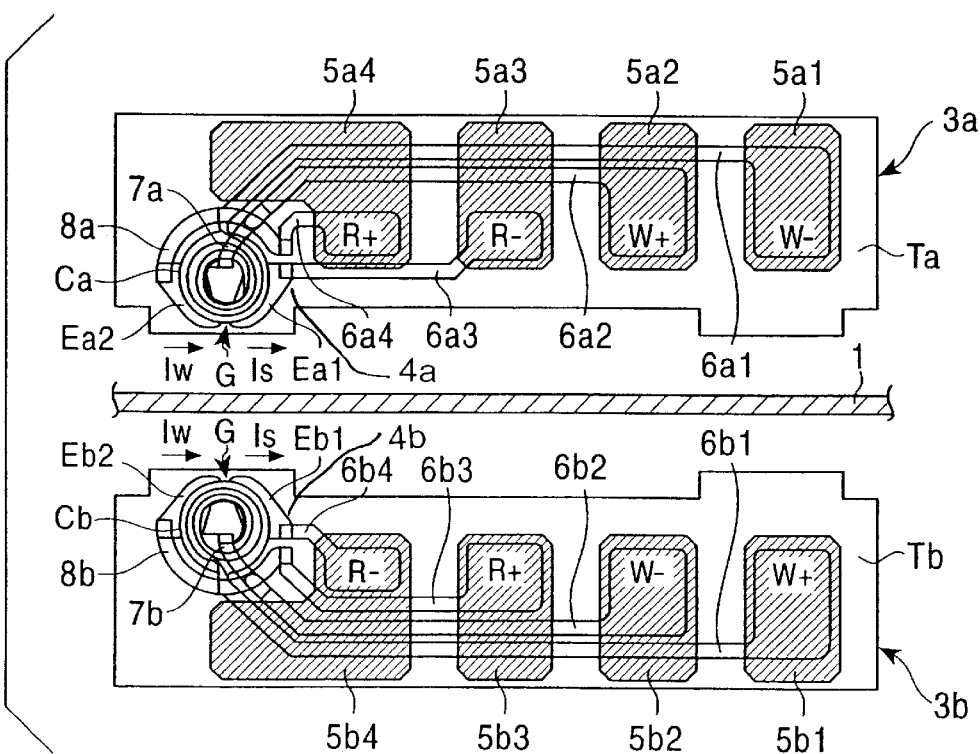
Figure 2A:
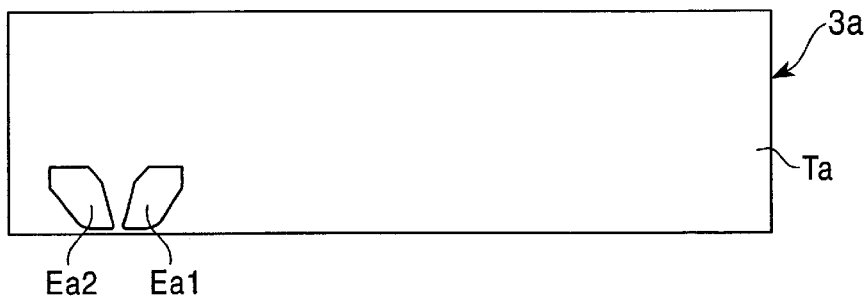
FIGS. 2A to 2D are process charts for illustrating a method for manufacturing the two-rail type slider according to the present invention.
Figure 2B:
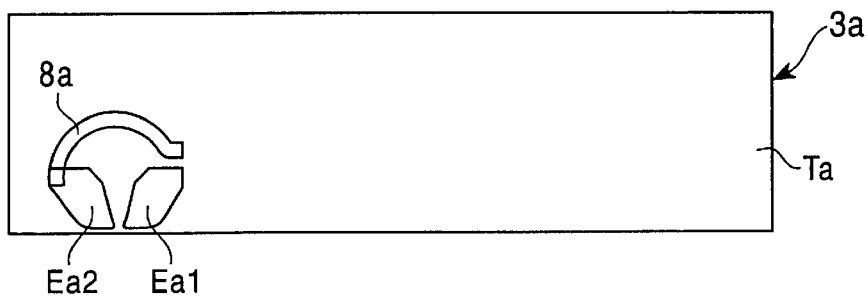
Figure 3A:
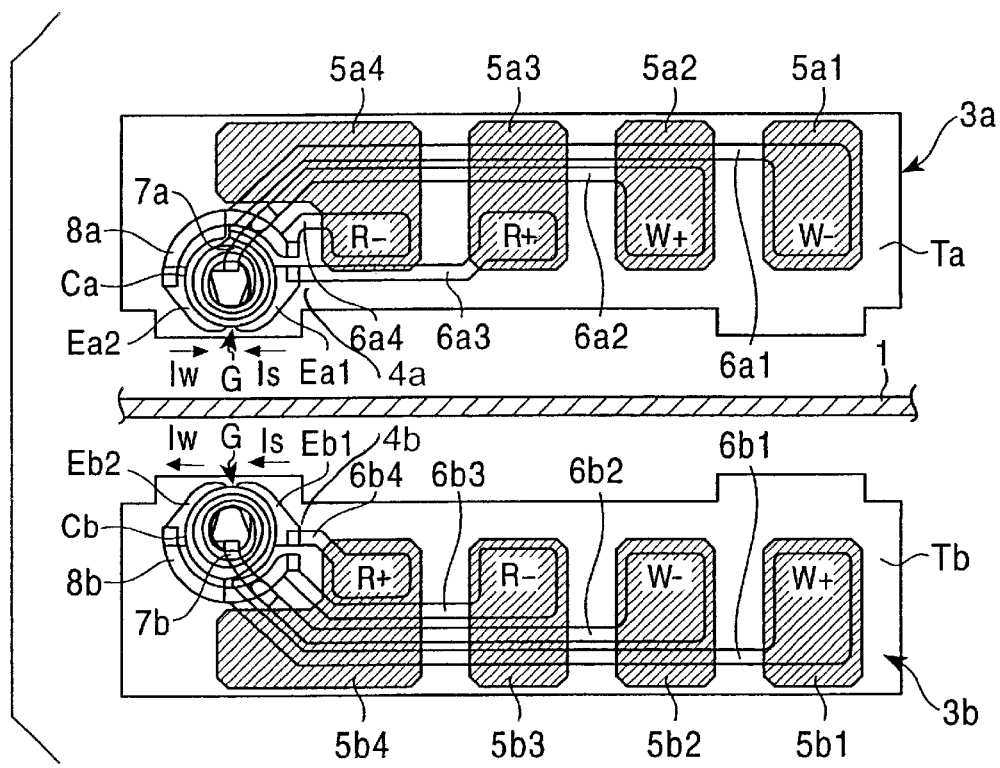
FIGS. 3A and 3B are schematic plan views of trailing side surfaces of the two-rail type sliders used for a thin-film magnetic head according to the present invention.
Figure 3B:
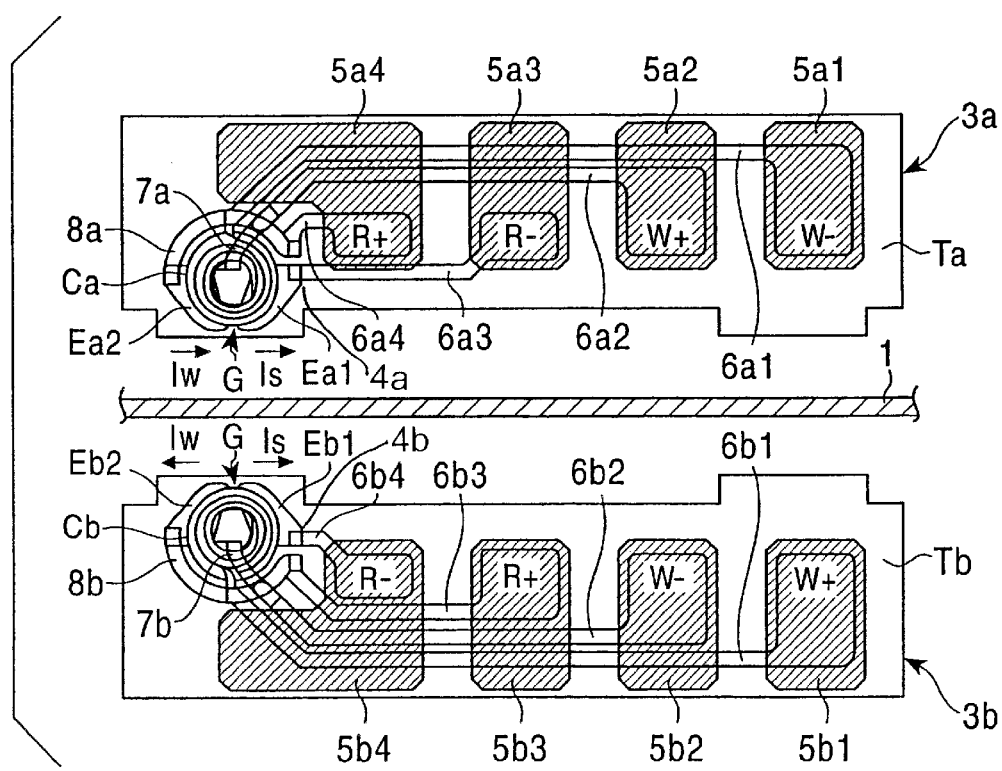
Figure 4A:
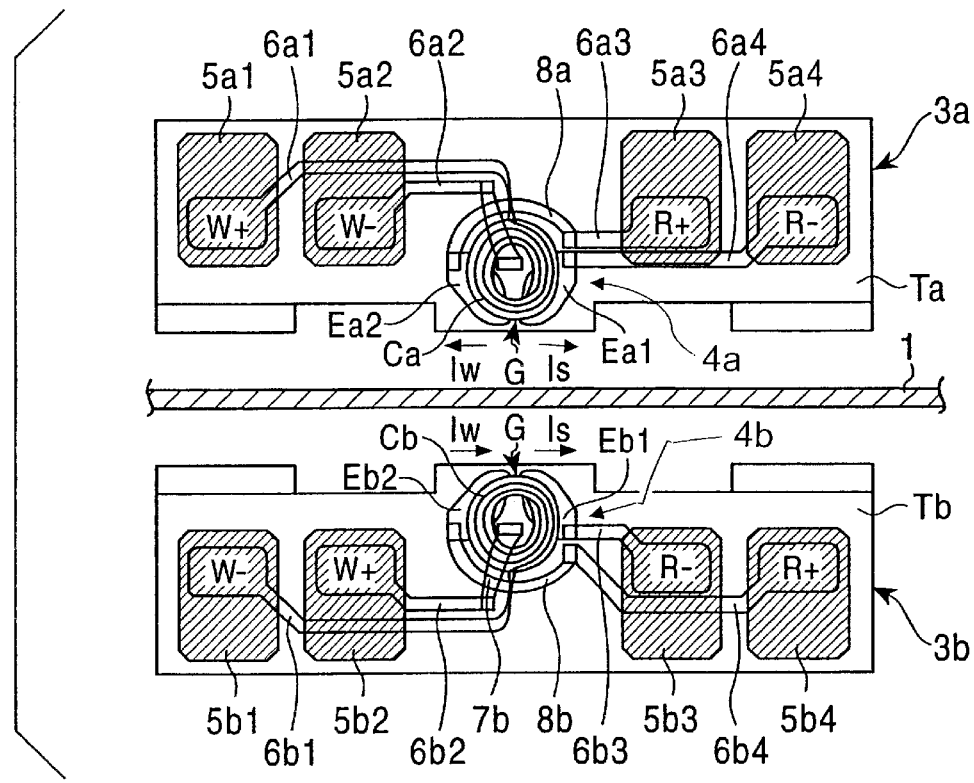
FIGS. 4A and 4B are schematic plan views of trailing side surfaces of three-rail type sliders used for a thin-film magnetic head according to the present invention.
Figure 4B:
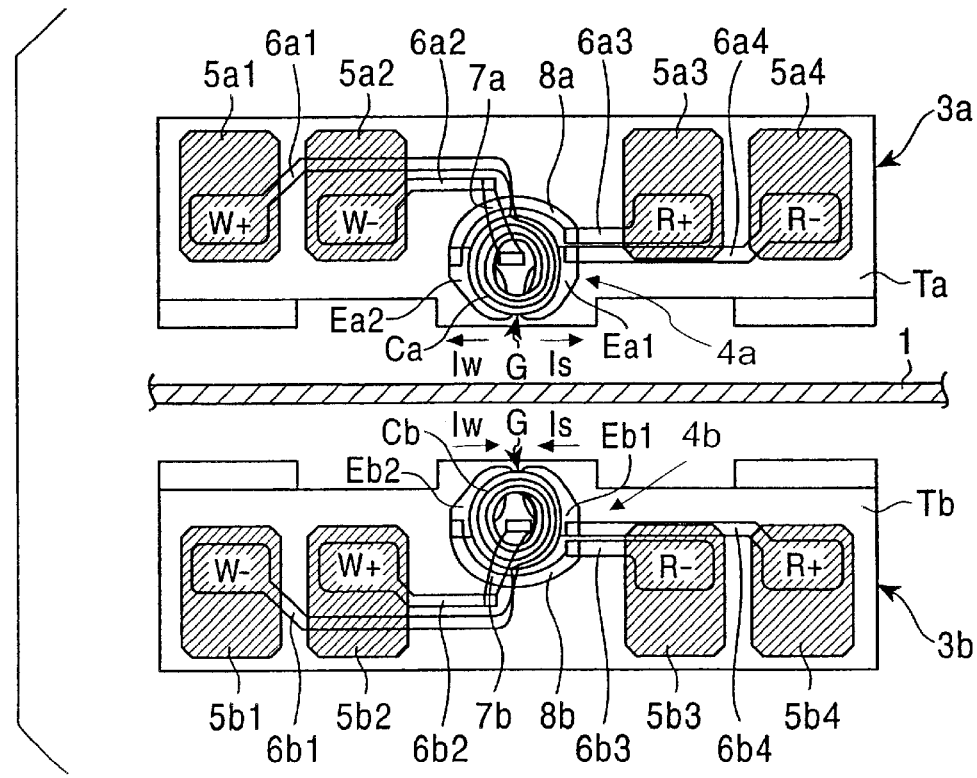
Figure 5A:
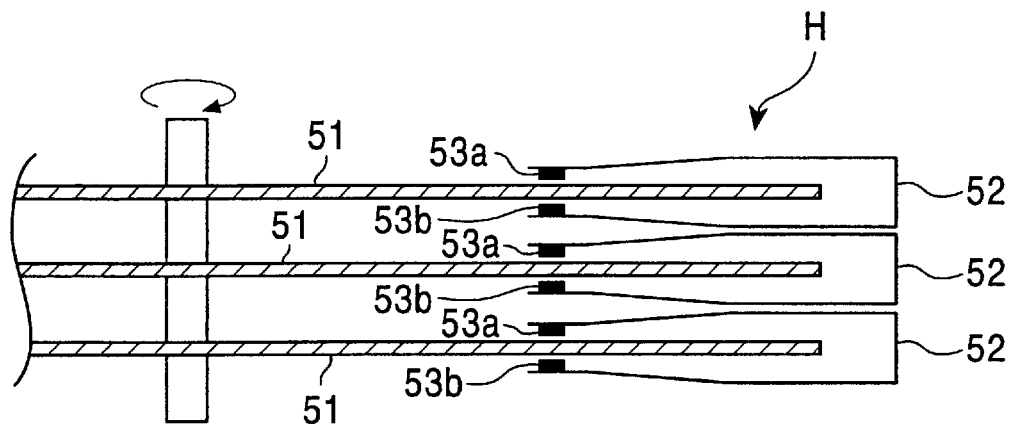
FIGS. 5A and 5B are schematic views for illustrating a magnetic writing/reading apparatus using a conventional thin-film magnetic head.
Figure 5B:
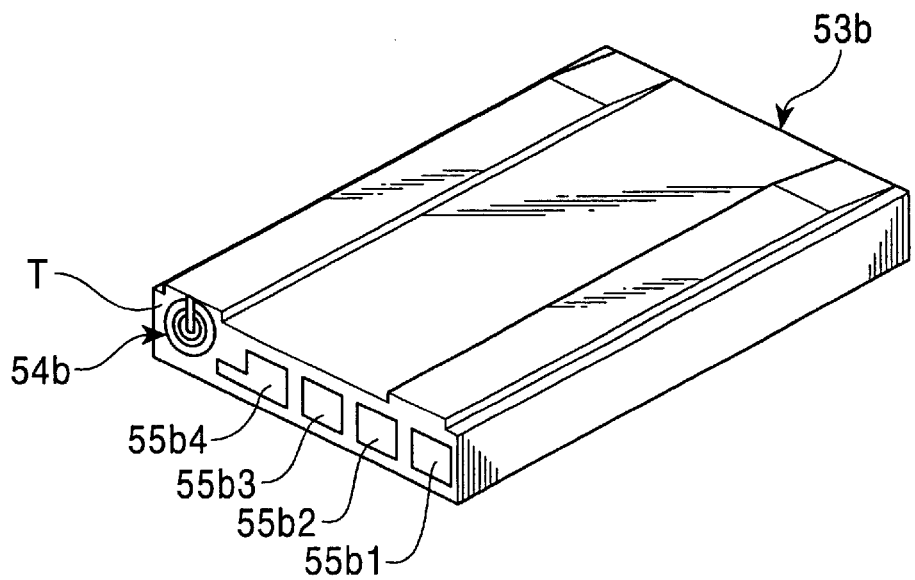
Figure 6:
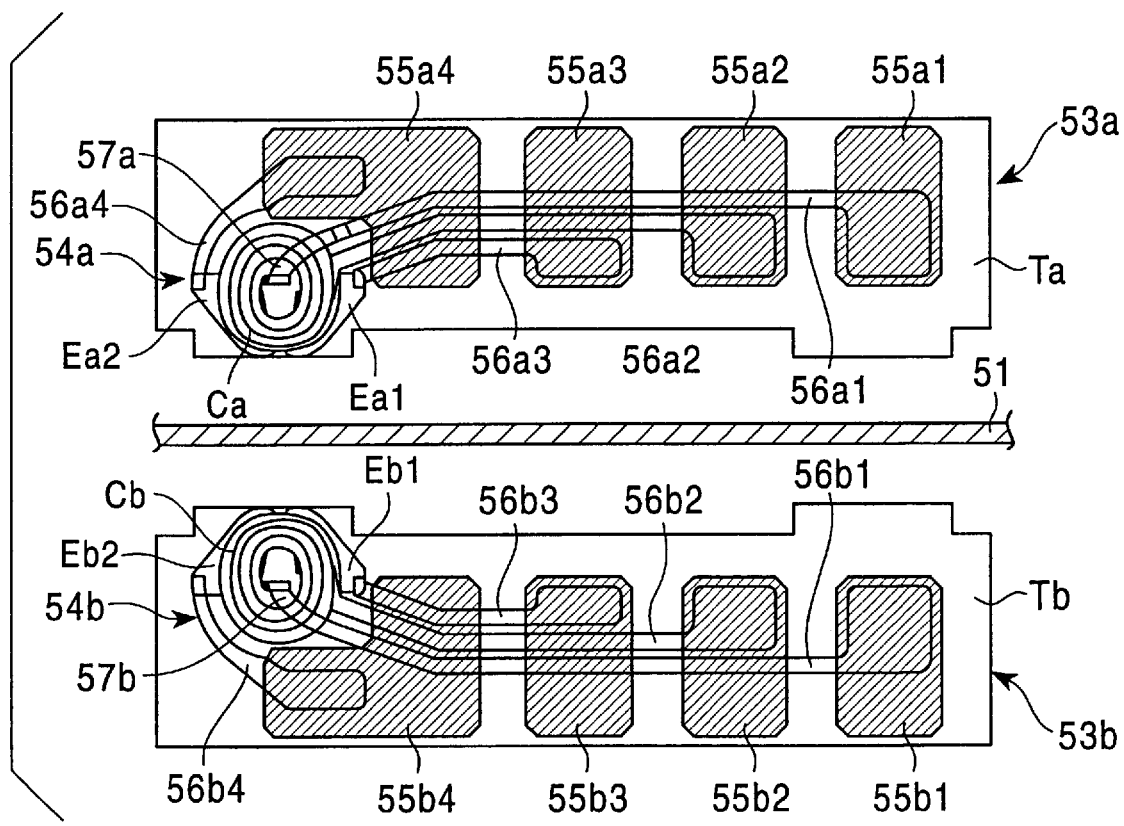
FIG. 6 is a schematic plan view of trailing side surfaces of sliders used for a conventional thin-film magnetic head.
Figure 7:
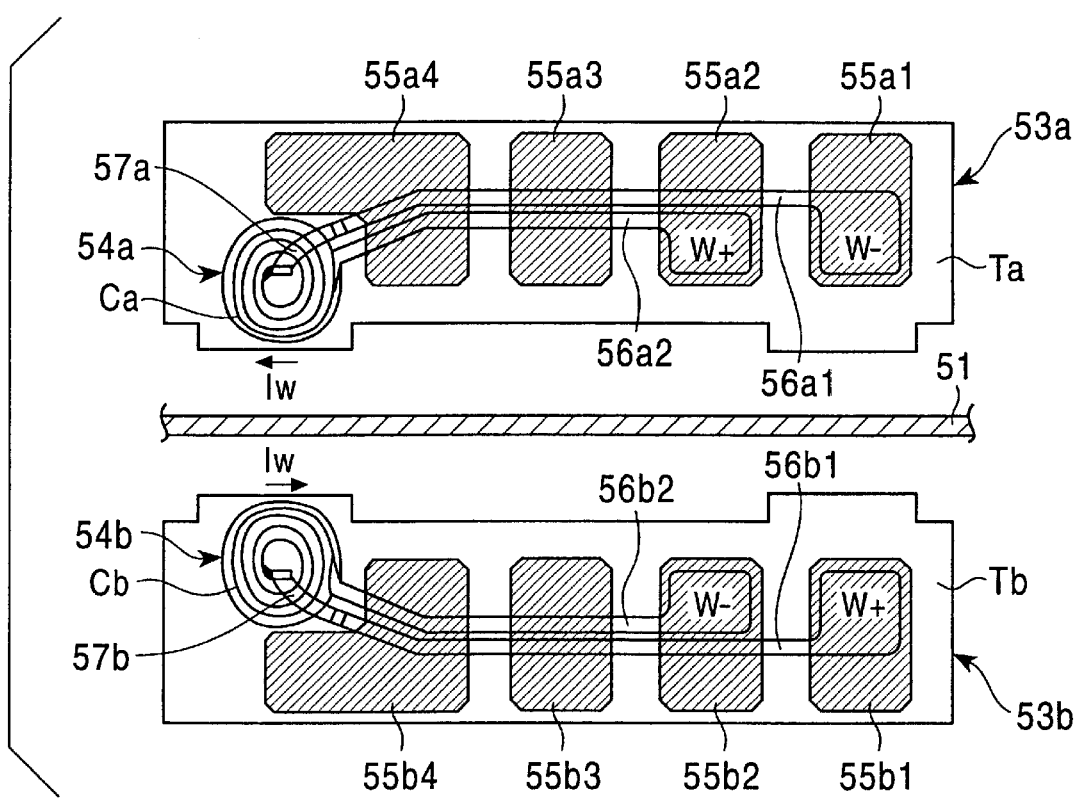
FIG. 7 is a schematic plan view of trailing side surfaces of sliders used for a conventional thin-film magnetic head.
Figure 8:
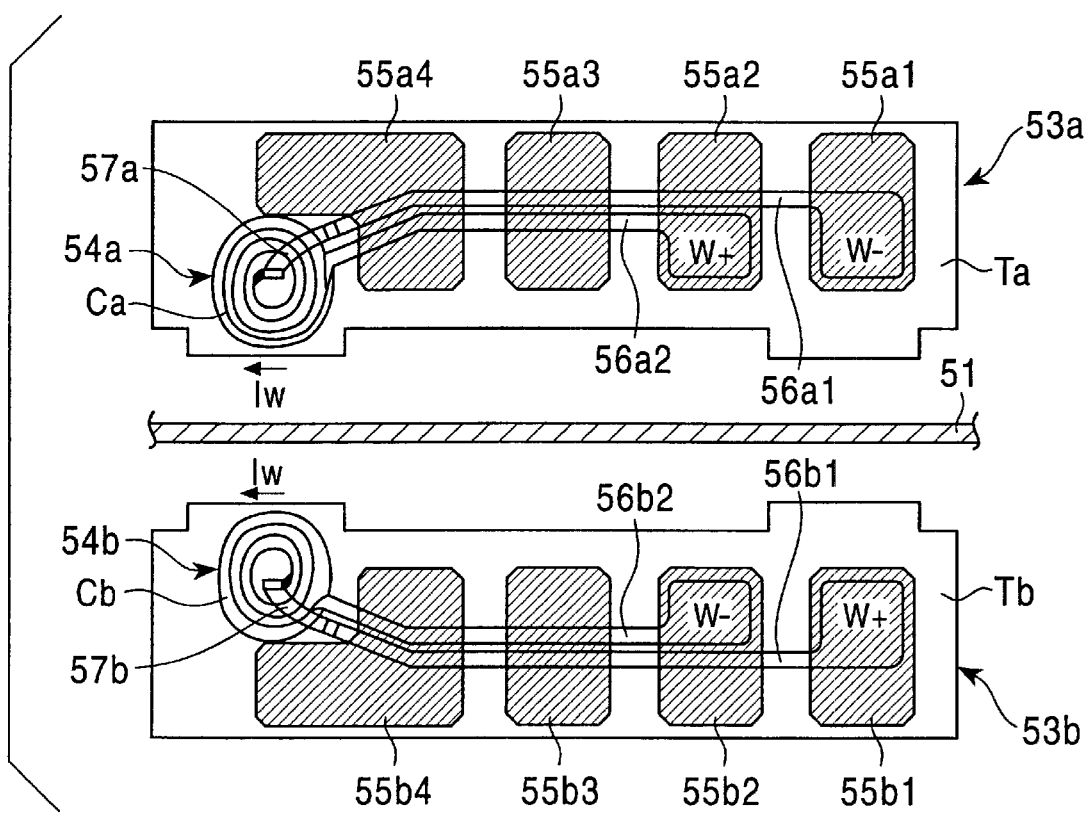
FIG. 8 is a schematic plan view of trailing side surfaces of sliders used for a conventional thin-film magnetic head.
Figure 9:
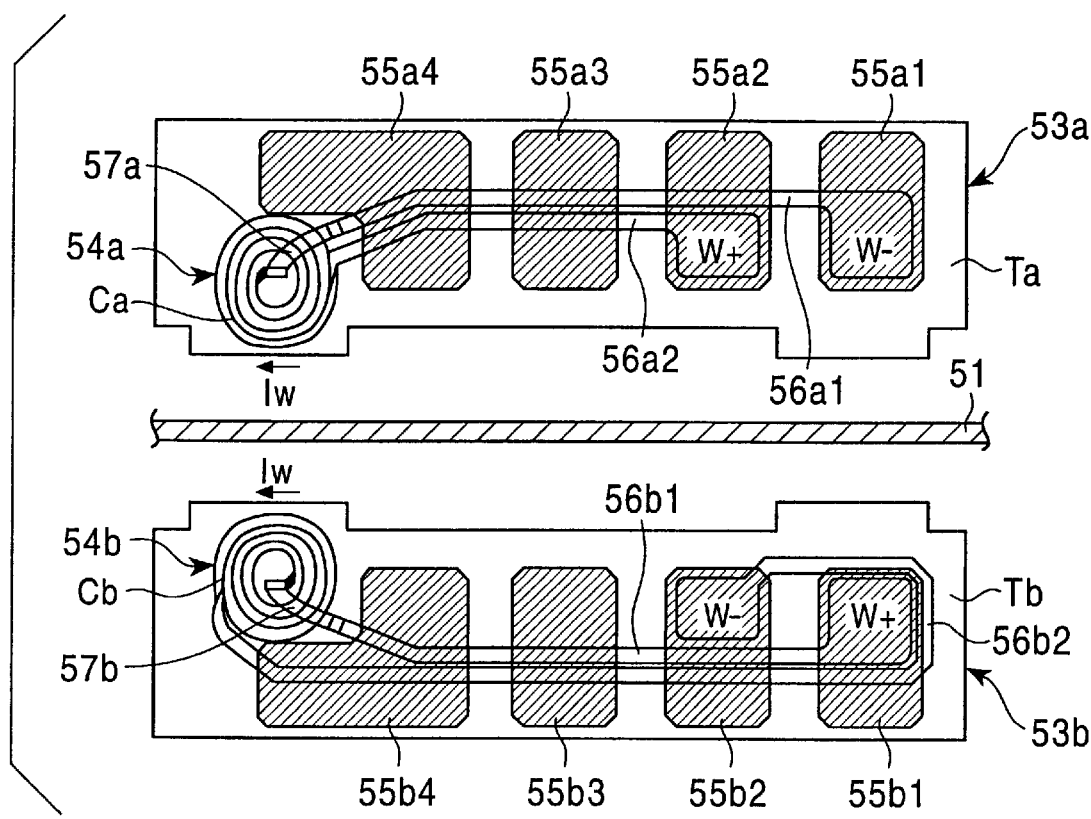
FIG. 9 is a schematic plan view of trailing side surfaces of sliders used for a conventional thin-film magnetic head.
Figure 10:
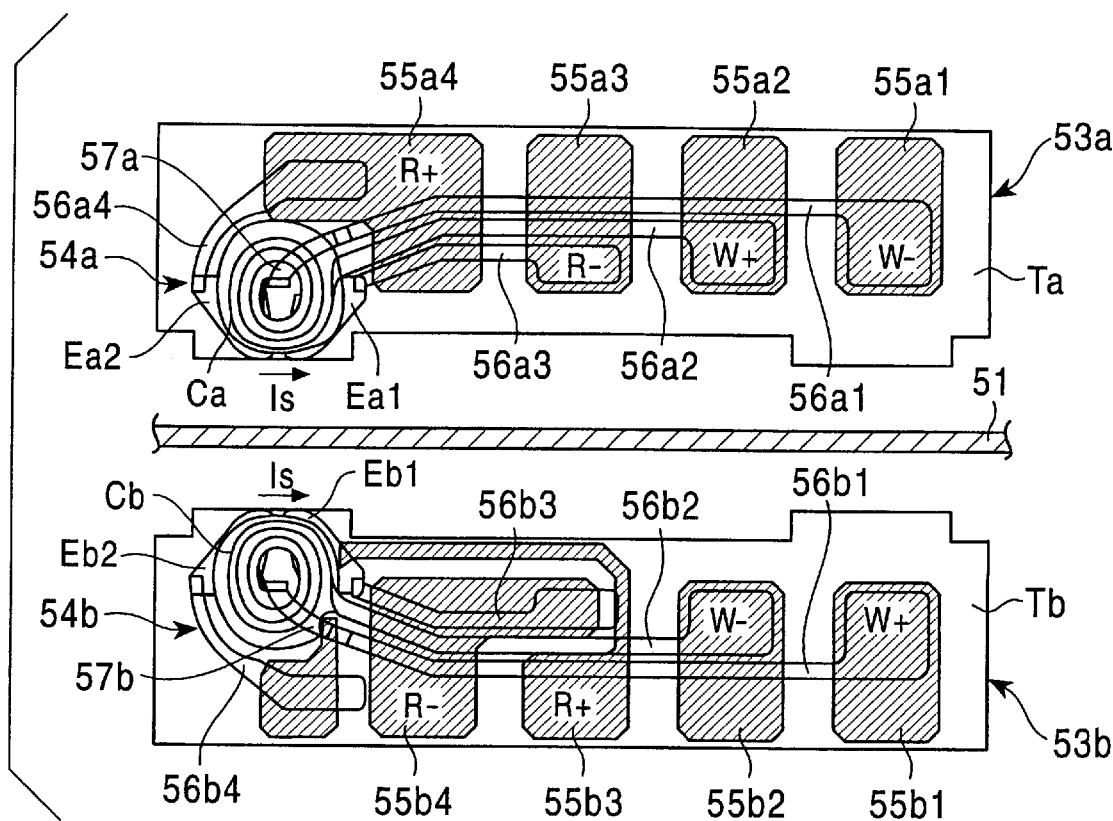
FIG. 10 is a schematic plan view of trailing side surfaces of sliders used for a conventional thin-film magnetic head.

Embodiments of a thin-film magnetic head according to the present invention will be described. FIGS. 1A and 1B are schematic plan views of trailing side surfaces of a two-rail type slider used for the thin-film magnetic head of the present invention. FIGS. 2A to 2D are processing diagrams illustrating a production method for the two rail-type slider used for the thin-film magnetic head of the present invention. FIGS. 3A and 3B are schematic plan views of the trailing side surfaces of the two-rail type slider used for the thin-film magnetic head of the present invention. FIGS. 4A and 4B are schematic plan views of trailing side surfaces of a three-rail type slider used for the thin-film magnetic head of the present invention.

Similarly to conventional thin-film magnetic heads, members of a pair of magnetic heads for a magnetic reading device, such as a hard disk apparatus, face each other and are disposed above and below each of a plurality of thin magnetic disks 1 that are stacked in spaced relation to one another. The magnetic head is composed of two sliders (an upper slider 3a and a lower slider 3b) which are mounted at edges of a supporting member (not shown) composed of a leaf springs, a flexible printed circuit board, or the like. As shown in FIG. 1A, on trailing side surface Ta of the slider 3a, there are provided thin-film head elements 4a and four bonding pads 5a1 to 5a4 which are to be connected to a peripheral processing circuit (not shown). Similarly to the above, on trailing side surface Tb of the slider 3b, there are provided thin-film head element 4b and four bonding pads 5b1 to 5b2 which are to be connected to a peripheral processing circuit (not shown).

The head elements 4a and 4b are so-called "combined thin-film magnetic heads" composed of MR heads for reading and inductive heads for writing laminated thereon. The MR heads include MR elements (not shown), and conductive layers Ea1 and Ea2 which are connected to the two ends of one MR element (not shown), and conductive layers Eb1 and Eb2 which are connected to the two ends of the other MR element (not shown). The conductive layers disposed at the bonding pads 5a4 and 5b4 sides are designated Ea1 and Eb1, respectively. The inductive heads include flat helicoid coils Ca and Cb, which are composed of a low resistance conductive material, such as Ni, or Cu, and are covered by insulating layers (not shown).

In the respective sliders 3a and 3b, four leads 6a1 to 6a4, and four leads 6b1 to 6b4, are composed of a low resistance conductive material, such as Ni or Cu. Four leads 6a1 to 6a4, and four leads 6b1 to 6b4, are disposed, respectively, on trailing side surface Ta at the head element 4a side and on trailing side surface Tb at the head element 4b side. Individual ends of leads 6a1 and 6b1 are connected to the peripheral edges of the coils Ca and Cb, in which the coils are disposed at sides opposite to gaps G for writing facing the magnetic disk 1. Individual ends of leads 6a2 and 6b2 are connected, respectively, to the central edge of coil Ca through upper connecting lead 7a and to the central edge of coil Cb through upper connecting lead 7b, in which the upper connecting leads are disposed on the insulating layers (not shown) so as to pass over coils Ca and Cb. Individual ends of leads 6a3 and 6b3 are connected to conductive layer Ea1 at the bonding pad 5a4 side through a contact hole (not shown) and to conductive layer Eb1 at the bonding pad 5b4 side through a contact hole (not shown). Individual ends of intermediate leads 8a and 8b are connected to the other conductive layers Ea2 and Eb2. The other ends of intermediate leads 8a and 8b are disposed along the peripheries of the coils Ca and Cb so as to be in close proximity to the conductive layers Ea1 and Eb1. Individual ends of leads 6a4 and 6b4 are connected to the other ends of intermediate leads 8a and 8b through contact holes (not shown).

The other ends of four leads 6a1 to 6a4 are connected to four bonding pads 5a1 to 5a4, and the other ends of four leads 6b1 and 6b4 are connected to four bonding pads 5b1 to 5b4, in which the bonding pads are provided on the upper layers of the respective leads mentioned above. Bonding pads 5a1 to 5a4, and 5b1 to 5b4, are provided with fine gold wires (not shown) which are connected to processing circuits (not shown) disposed outside. Signal currents for writing by the inductive heads are fed from bonding pads 5a1 and 5a2, and 5b1 and 5b2, and currents (sense currents) for reading by the MR head are fed from bonding pads 5a3 and 5a4, and 5b3 and 5b4.

Next, a method for manufacturing the thin-film magnetic head of the present invention will be explained with reference to the drawings. In the following drawings, the upper slider 3a is described as an example. As shown in FIG. 2A, conductive layers Ea1 and Ea2 are formed at the two ends of the MR element (not shown) formed on trailing side surface Ta of slider 3a, and conductive layers Eb1 and Eb2 are formed at the two ends of the other MR element (not shown) formed on trailing side surface Tb of slider 3b, so that the MR heads are formed. An upper shield layers (not shown) composed of a Ni—Fe based alloy are formed on the MR heads by plating. As shown in FIG. 2B, intermediate leads 8a and 8b are formed in the same step as mentioned above, and individual ends of leads 8a and 8b are connected to conductive layers Ea2 and Eb2 through the contact holes (not shown). The other ends of leads 8a and 8b are disposed in close proximity to the other conductive layers Ea1 and Eb1. Then, layers (not shown) of a non-magnetic material and first insulating layers are sequentially laminated.

Figure 2C:
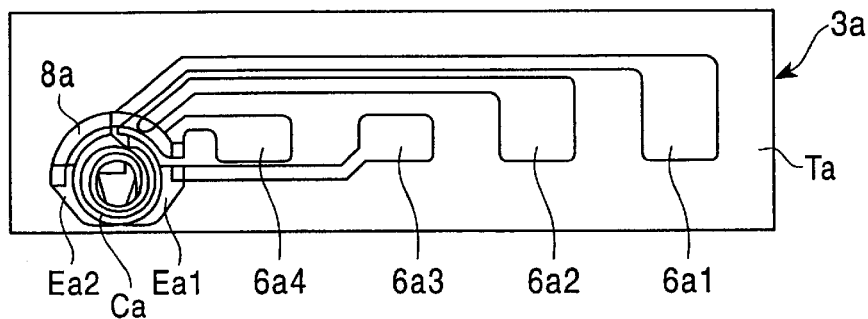
Figure 2D:
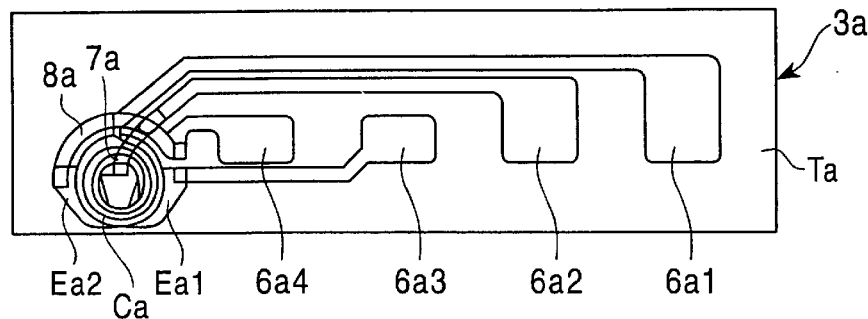

As shown in FIG. 2C, coils Ca and Cb composed of Cu or the like are formed on the first insulating layers (not shown) by a method of photolithography or plating. In the same step mentioned above, leads 6a1 to 6a4, and 6b1 to 6b4, are formed on the same layers. Leads 6a1 and 6b1 are formed so as to be connected to the ends of the periphery of the coils at the sides opposite to gaps G for writing facing magnetic disk 1. Individual ends of leads 6a2 and 6b2 are provided so as to be disposed at the connecting portion sides, where the periphery of coil Ca and lead 6a1 is connected and where the periphery of coil Cb and lead 6b1 is connected. Individual ends of leads 6a3 and 6b3 are connected to conductive layers Ea1 and Eb1, in which the conductive layers are connected to the MR elements (not shown) through the contact holes (not shown) provided beforehand at the layers of a non-magnetic material (not shown) and at the first insulating layers (not shown). Individual ends of 6a4 and 6b4 are disposed so as to be connected to intermediate leads 8a and 8b, through the contact holes (not shown) provided beforehand at the layers of non-magnetic material (not shown) and at the first insulating layers (not shown). Intermediate leads 8a and 8b are disposed in close proximity to the connecting portions between lead 6a3 and conductive layer Ea2, and between lead 6b3 and conductive layer Eb2.

Second insulating layers (not shown) are provided by coating an organic material or the like so as to cover coils Ca and Cb, intermediate leads 8a and 8b, and leads 6a1 to 6a4, and 6b1 to 6b4 (except for the areas of the other ends thereof). The second insulating layers are provided with contact holes (not shown) leading to the central edges of coils Ca and Cb. Then, upper core layers (not shown) are formed on the second insulating layers (not shown) by using Ni—Fe based alloy (Permalloy) by a frame plating method. In the same step mentioned above, as shown in FIG. 2D, in order to connect individual ends of leads 6a2 and 6b2 with the central edges of coils Ca and Cb, respectively, through the contact holes (not shown) provided at the second insulating layers (not shown), upper connecting leads 7a and 7b are provided so as to pass over coils Ca and Cb, and intermediate leads 8a and 8b. At the other ends of leads 6a1 to 6a4, and 6b1 to 6b4, bumps (not shown) are formed as connecting members for bonding pads 5a1 to 5a4, and 5b1 to 5*b*4, which are formed later so that the bonding pads exceed heights of the upper core layers (not shown).

Next, protective layers (not shown) composed of alumina or the like are formed by sputtering so as to cover the upper layers of the upper core layers (not shown), leads 6*a*1 to 6*a*4, leads 6*b*1 to 6*b*4, and the like. The protective layers are polished until parts of the bumps (not shown) thereunder are exposed, and then, gold bonding pads 5*a*1 to 5*a*4, and 5*b*1 to 5*b*4 are formed on the exposed bumps (not shown) by plating. Finally, sliders 3*a* and 3*b* are completed after shaping them by polishing or the like, as shown in FIGS. 1A and 1B. Sliders 3*a* and 3*b* are mounted at the supporting member (not shown), and then bonding pads 5*a*1 to 5*a*4, and 5*b*1 to 5*b*4, are connected to flexible printed circuit boards (not shown) connected to processing circuits by fine gold wires (not shown). Thus, the magnetic head can be obtained.

Members of a pair of sliders 3*a* and 3*b* in FIG. 1A have a so-called "mirrored pattern" relationship. That is, when gaps G for writing are observed from the magnetic disk 1 side, bonding pads 5*a*1 to 5*a*4 in upper slider 3*a* are disposed on the right side, and bonding pads 5*b*1 to 5*b*4 of lower slider 3*b* are disposed on the left side. Hence, the leading directions of leads 6*a*1 to 6*a*4, and 6*b*1 to 6*b*4, from coils Ca and Cb, and from the MR elements (that are conductive layers Ea1 and Ea2, and Eb1 and Eb2) are opposite to each other. In bonding pads 5*a*1 to 5*a*4 and bonding pads 5*b*1 to 5*b*4, when polarities of bonding pads 5*a*1 and 5*a*2, and 5*b*1 and 5*b*2 for writing, and polarities of bonding pads 5*a*3 and 5*a*4, and 5*b*3 and 5*b*4 for reading, are asymmetrical to each other, both flow directions of currents Iw for writing and sense currents Is at slider 3*a* and slider 3*b* are opposite to each other (in this case, direction of magnetization of MR elements (not shown) are also opposite).

When currents Iw are required to flow in the same directions, as shown in FIG. 1B, this can be achieved by reversing the winding direction of coil Cb in lower slider 3*b* so as to be opposite to that of coil Ca in upper slider 3*a*, that is, by arranging winding directions of coils Ca and Cb in the same directions when they are observed from a trailing edge side of the sliders. Since the connecting portions of the periphery of coil Ca and lead 6*a*1, and the periphery of coil Cb and lead 6*b*1, are provided at the sides opposite to gaps G facing magnetic disk 1, the total length of leads 6*a*1 and 6*a*2 in upper slider 3*a* are approximately equal to that of leads 6*b*1 and 6*b*2 in lower slider 3*b*.

When polarities of bonding pads 5*a*1 and 5*a*2, and 5*b*1 and 5*b*2, connected to the inductive heads, or directions of currents Iw for writing are variously required, this can be achieved, under the condition that positions of leads 6*a*1 to 6*a*4, and 6*b*1 to 6*b*4, are defined as described above, by selectively reversing winding directions of coil Ca and/or coil Cb without changing wiring lengths in upper slider 3*a* and in lower slider 3*b*. In addition, electric resistances of individual wirings are equal to each other, so that signal processing can be reliable and consistent signal intensity can be obtained.

When sense currents Is are required to flow in the same directions, this can be achieved, after rendering direction of magnetization of MR elements (not shown) in the same directions, by connecting lead 6*b*3 connected to conductive layer Eb1 in FIG. 1A to intermediate lead 8*b* as shown in FIG. 1B, and in contrast, by connecting lead 6*b*4 connected to intermediate lead 8*b* in FIG. 1A to conductive layer Eb1 as shown in FIG. 1B.

Intermediate leads 8*a* and 8*b*, which are disposed so as to pass under the lower layers of the other leads, are connected to conductive layers Ea2 and Eb2 provided at sides opposite to that on which bonding pads 5*a*1 to 5*a*4, and 5*b*1 to 5*b*4, are disposed, and the other ends of intermediate leads 8*a* and 8*b* are provided at the other conductive layers Ea1 and Eb1 sides. Hence, when directions of sense currents Is in accordance with directions of magnetization of MR elements (not shown), or polarities of bonding pads 5*a*3 and 5*a*4, and 5*b*3 and 5*b*4, are variously different, leads 6*a*3 and 6*a*4, leads 6*b*3 and 6*b*4, bonding pads 5*a*3 and 5*a*4, and bonding pads 5*b*3 and 5*b*4, can be disposed without extension thereof, as shown in FIGS. 3A and 3B. The forms of leads in upper slider 3*a* and lower slider 3*b* extending to the other ends of intermediate leads 8*a* and 8*b*, and to conductive layers Ea1 and Eb1 are slightly different; however, the total wiring length of leads 6*a*3 and 6*a*4, and bonding pads 5*a*3 and 5*a*4 in slider 3*a* can be designed to be approximately equal to that of leads 6*b*3 and 6*b*4, and bonding pads 5*b*3 and 5*b*4 in slider 3*b*.

When winding directions of coils Ca and Cb, and forms of leads 6*a*1 to 6*a*4, and 6*b*1 to 6*b*4, are to be changed, this can be accomplished merely by changing patterns of exposure masks used for photolithographic steps, and no additional steps are required, whereby production can be performed inexpensively and simply. In addition, intermediate leads 8*a* and 8*b* are formed at the same step in which the lower core layers (not shown) are formed by plating, so that they can be formed simply without any additional steps.

In the embodiments of the present invention, the combined thin-film magnetic head having inductive head and MR head laminated together was explained; however, the embodiments of the present invention can also be applied to thin-film magnetic heads having separate individual heads.

In the embodiments described above, a so-called "two-rail type slider" having head elements disposed on the edge portions of individual trailing side surfaces was explained. However, the embodiments can also be applied to a so-called "three-rail type slider" having head elements disposed at the center and two bonding pads disposed at both edges of the individual trailing side surfaces. Three-rail type sliders 3*a* and 3*b* shown in FIG. 4A have a "mirrored pattern" relationship to each other. When gap G in slider 3*a* is observed from magnetic disk 1 side, a pair of bonding pads 5*a*1 and 5*a*2 connected to coil Ca, and bonding pads 5*a*3 and 5*a*4 connected to an MR element (that is, conductive layers Ea1 and Ea2) are disposed at both sides of coil Ca. Similarly to those described above, in slider 3*b*, a pair of bonding pads 5*b*1 and 5*b*2 connected to coil Cb, and bonding pads 5*b*3 and 5*b*4 connected to an MR element (that is, conductive layers Eb1 and Eb2) are disposed at both sides of coil Cb. In this example, flow directions of currents Iw for writing and sense currents Is are opposite at sliders 3*a* and 3*b* (in this case, directions of magnetization of MR heads (not shown) are also opposite).

When flows of currents Iw for writing are required to be in the same directions, as shown in FIG. 4B, it can be achieved by reversing a winding direction of coil Cb in lower slider 3*b* so as to be opposite to that of coil Ca in upper slider 3*a*, that is, by arranging winding directions of coils Ca and Cb in the same directions when they are observed from a trailing edge side of the sliders. Since the connecting portions of the periphery of coil Ca and lead 6*a*1, and the periphery of coil Cb and lead 6*b*1, are provided at the sides opposite to gaps G facing magnetic disk 1, the total length of leads 6*a*1 and 6*a*2 of upper slider 3*a* is approximately equal to that of leads 6*b*1 and 6*b*2 of lower slider 3*b*.

When sense currents Is are required to flow in the same directions, this can be achieved, after rendering directions of magnetization of MR elements (not shown) in the same directions, by connecting lead 6b3 connected to conductive layer Eb1 in FIG. 4A to intermediate lead 8b as shown in FIG. 4B, and in contrast, by connecting lead 6b4 connected to intermediate lead 8b in FIG. 4A to conductive layer Eb1 as shown in FIG. 4B.

In the three-rail type slider described above, when flow directions of currents for writing and sense currents are required to optionally change by changing winding directions of coils, under the condition that polarities of electrodes at individual bonding pads 5a1 to 5a4 and a flow direction of sense current Is in accordance with polarized direction of the MR element have been already determined, this can be easily achieved by defining positions where leads are extended from the coils and from the MR elements (that is, conductive layers) so that the total lengths of individual leads (wiring length) are equal to each other.

What is claimed is:

1. A thin film magnetic head apparatus comprising a pair of sliders, each slider including a thin-film magnetic head, each thin-film magnetic head comprising:
   a magnetoresistive magnetic head for reading having a magnetoresistive element, the magnetoresistive element having two ends;
   two conductive layers respectively connected to a different end of the two ends of the magnetoresistive element;
   an inductive magnetic head for writing laminated above the magnetoresistive magnetic head, the inductive magnetic head having:
      a lower core layer,
      a coil, and
      an upper core layer;
   a first lead disposed on a first insulating layer and connected to a central edge of the coil;
   a second lead disposed on the first insulating layer and connected to the coil at a peripheral edge thereof, the second lead disposed at more distal to a writing gap than the first lead;
   an intermediate lead disposed on a second insulating layer, a first end of the intermediate lead being connected to a first conductive layer of the conductive layers, and the second end of the intermediate lead being disposed more proximate to a second conductive layer of the conductive layers than the first conductive layer;
   a third lead connected to the second end of the intermediate lead; and
   a fourth lead connected to the second conductive layer.

2. A thin film magnetic head apparatus according to claim 1, each slider further comprising a first bonding pad connected with the first lead, a second bonding pad connected with the second lead, a third bonding pad connected with the third lead and a fourth bonding pad connected with the fourth lead, the first and second leads passing over the coil on the first insulating layer, the third and fourth leads disposed on the first insulating layer.

3. A thin film magnetic head apparatus according to claim 2, wherein the coils are wound in opposite directions as viewed from a trailing edge side of the sliders.

4. A thin film magnetic head apparatus according to claim 3, wherein on each slider: the bonding pads are disposed such that the third, fourth, first and second bonding pads are disposed in order from most proximate to most distal to the magnetic heads of the slider.

5. A thin film magnetic head apparatus according to claim 3, wherein on one slider the bonding pads are disposed such that the third, fourth, first and second bonding pads are disposed in order from most proximate to most distal to the magnetic heads on the one slider and on the other slider bonding pads are disposed such that the fourth, third, first and second bonding pads are disposed in order from most proximate to most distal to the magnetic heads on the other slider.

6. A thin film magnetic head apparatus according to claim 3, wherein the magnetic heads and bonding pads on one slider and the magnetic heads and bonding pads on other slider are symmetrically disposed around a space between the pair of sliders.

7. A thin film magnetic head apparatus according to claim 3, wherein the magnetic heads and first and second bonding pads on one slider and the magnetic heads and first and second bonding pads on other slider are symmetrically disposed around a space between the pair of sliders while positions of the third and fourth bonding pads with respect to the magnetic heads are exchanged around the space between the pair of sliders.

8. A thin film magnetic head apparatus according to claim 2, wherein the coils are wound the same direction as viewed from a trailing edge side of the sliders.

9. A thin film magnetic head apparatus according to claim 8, wherein on each slider: the bonding pads are disposed such that the third, fourth, first and second bonding pads are disposed in order from most proximate to most distal to the magnetic heads of the slider.

10. A thin film magnetic head apparatus according to claim 8, wherein on one slider the bonding pads are disposed such that the third, fourth, first and second bonding pads are disposed in order from most proximate to most distal to the magnetic heads on the one slider and on the other slider bonding pads are disposed such that the fourth, third, first and second bonding pads are disposed in order from most proximate to most distal to the magnetic heads on the other slider.

11. A thin film magnetic head apparatus according to claim 8, wherein the magnetic heads and bonding pads on one slider and the magnetic heads and bonding pads on other slider are symmetrically disposed around a space between the pair of sliders.

12. A thin film magnetic head apparatus according to claim 8, wherein the magnetic heads and first and second bonding pads on one slider and the magnetic heads and first and second bonding pads on other slider are symmetrically disposed around a space between the pair of sliders while positions of the third and fourth bonding pads with respect to the magnetic heads are exchanged around the space between the pair of sliders.

13. A thin film magnetic head apparatus comprising a pair of two rail sliders, each slider including a thin-film magnetic head, each thin-film magnetic head comprising:
   a magnetoresistive magnetic head for reading having a magnetoresistive element, the magnetoresistive element having two ends;
   two conductive layers respectively connected to a different end of the two ends of the magnetoresistive element;
   an inductive magnetic head for writing laminated above the magnetoresistive magnetic head, the inductive magnetic head having:
      a lower core layer,
      a coil, and
      an upper core layer;
   a first lead disposed on a first insulating layer and connected to a central edge of the coil and to a first bonding pad;

a second lead disposed on the first insulating layer and connected to the coil at a peripheral edge thereof and to a second bonding pad, the second lead disposed at more distal to a writing gap than the first lead;

an intermediate lead disposed on a second insulating layer, a first end of the intermediate lead being connected to a first conductive layer of the conductive layers, and the second end of the intermediate lead being disposed more proximate to a second conductive layer of the conductive layers than the first conductive layer;

a third lead connected to the second end of the intermediate lead and to a third bonding pad and disposed on the first insulating layer; and a fourth lead connected to the second conductive layer and to a fourth bonding pad and disposed on the first insulating layer;

wherein the magnetic heads are disposed on one side of each slider.

14. A thin film magnetic head apparatus according to claim 13, wherein the coils are wound in opposite directions as viewed from a trailing edge side of the sliders.

15. A thin film magnetic head apparatus according to claim 14, wherein on each slider: the bonding pads are disposed such that the third, fourth, first and second bonding pads are disposed in order from most proximate to most distal to the magnetic heads of the slider.

16. A thin film magnetic head apparatus according to claim 14, wherein on one slider the bonding pads are disposed such that the third, fourth, first and second bonding pads are disposed in order from most proximate to most distal to the magnetic heads on the one slider and on the other slider bonding pads are disposed such that the fourth, third, first and second bonding pads are disposed in order from most proximate to most distal to the magnetic heads on the other slider.

17. A thin film magnetic head apparatus according to claim 14, wherein the magnetic heads and bonding pads on one slider and the magnetic heads and bonding pads on other slider are symmetrically disposed around a space between the pair of sliders.

18. A thin film magnetic head apparatus according to claim 14, wherein the magnetic heads and first and second bonding pads on one slider and the magnetic heads and first and second bonding pads on other slider are symmetrically disposed around a space between the pair of sliders while positions of the third and fourth bonding pads with respect to the magnetic heads are exchanged around the space between the pair of sliders.

19. A thin film magnetic head apparatus according to claim 13, wherein the coils are wound the same direction as viewed from a trailing edge side of the sliders.

20. A thin film magnetic head apparatus according to claim 19, wherein on each slider: the bonding pads are disposed such that the third, fourth, first and second bonding pads are disposed in order from most proximate to most distal to the magnetic heads of the slider.

21. A thin film magnetic head apparatus according to claim 19, wherein on one slider the bonding pads are disposed such that the third, fourth, first and second bonding pads are disposed in order from most proximate to most distal to the magnetic heads on the one slider and on the other slider bonding pads are disposed such that the fourth, third, first and second bonding pads are disposed in order from most proximate to most distal to the magnetic heads on the other slider.

22. A thin film magnetic head apparatus according to claim 19, wherein the magnetic heads and bonding pads on one slider and the magnetic heads and bonding pads on other slider are symmetrically disposed around a space between the pair of sliders.

23. A thin film magnetic head apparatus according to claim 19, wherein the magnetic heads and first and second bonding pads on one slider and the magnetic heads and first and second bonding pads on other slider are symmetrically disposed around a space between the pair of sliders while positions of the third and fourth bonding pads with respect to the magnetic heads are exchanged around the space between the pair of sliders.

24. A thin film magnetic head apparatus comprising a pair of three rail sliders, each slider including a thin-film magnetic head, each thin-film magnetic head comprising:

a magnetoresistive magnetic head for reading having a magnetoresistive element, the magnetoresistive element having two ends;

two conductive layers respectively connected to a different end of the two ends of the magnetoresistive element;

an inductive magnetic head for writing laminated above the magnetoresistive magnetic head, the inductive magnetic head having:
a lower core layer,
a coil, and
an upper core layer;

a first lead disposed on a first insulating layer and connected to a central edge of the coil and to a first bonding pad;

a second lead disposed on the first insulating layer and connected to the coil at a peripheral edge thereof and to a second bonding pad, the second lead disposed at more distal to a writing gap than the first lead;

an intermediate lead disposed on a second insulating layer, a first end of the intermediate lead being connected to a first conductive layer of the conductive layers, and the second end of the intermediate lead being disposed more proximate to a second conductive layer of the conductive layers than the first conductive layer;

a third lead connected to the second end of the intermediate lead and to a third bonding pad and disposed on the first insulating layer; and a fourth lead connected to the second conductive layer and to a fourth bonding pad and disposed on the first insulating layer;

wherein the magnetic heads are disposed on a middle of each slider.

25. A thin film magnetic head apparatus according to claim 24, wherein the coils are wound in opposite directions as viewed from a trailing edge side of the sliders.

26. A thin film magnetic head apparatus according to claim 25, wherein on each slider: the bonding pads are disposed such that the first and third bonding pads are disposed a first distance from the magnetic heads, and second and fourth bonding pads are disposed a second distance from the magnetic heads, and the first and third bonding pads are more proximate to the magnetic heads of the slider than the second and fourth bonding pads.

27. A thin film magnetic head apparatus according to claim 25, wherein on one slider the bonding pads are disposed such that the first and third bonding pads are disposed a first distance from the magnetic heads, and second and fourth bonding pads are disposed a second distance from the magnetic heads, the first and third bonding pads are more proximate to the magnetic heads of the slider than the second and fourth bonding pads, and on the other slider the bonding pads are disposed such that the first and fourth bonding pads are disposed the first distance from the magnetic heads, and second and third bonding pads are disposed the second distance from the magnetic heads with the first and fourth bonding pads more proximate to the magnetic heads of the other slider than the second and third bonding pads.

28. A thin film magnetic head apparatus according to claim 25, wherein the magnetic heads and bonding pads on one slider and the magnetic heads and bonding pads on other slider are symmetrically disposed around a space between the pair of sliders.

29. A thin film magnetic head apparatus according to claim 25, wherein the magnetic heads and first and second bonding pads on one slider and the magnetic heads and first and second bonding pads on other slider are symmetrically disposed around a space between the pair of sliders while positions of the third and fourth bonding pads with respect to the magnetic heads are exchanged around the space between the pair of sliders.

30. A thin film magnetic head apparatus according to claim 24, wherein the coils are wound the same direction as viewed from a trailing edge side of the sliders.

31. A thin film magnetic head apparatus according to claim 30, wherein on each slider: the bonding pads are disposed such that the first and third bonding pads are disposed a first distance from the magnetic heads, and second and fourth bonding pads are disposed a second distance from the magnetic heads, and the first and third bonding pads are more proximate to the magnetic heads of the slider than the second and fourth bonding pads.

32. A thin film magnetic head apparatus according to claim 30, wherein on one slider the bonding pads are disposed such that the first and third bonding pads are disposed a first distance from the magnetic heads, and second and fourth bonding pads are disposed a second distance from the magnetic heads, the first and third bonding pads are more proximate to the magnetic heads of the slider than the second and fourth bonding pads, and on the other slider the bonding pads are disposed such that the first and fourth bonding pads are disposed the first distance from the magnetic heads, and second and third bonding pads are disposed the second distance from the magnetic heads with the first and fourth bonding pads more proximate to the magnetic heads of the other slider than the second and third bonding pads.

33. A thin film magnetic head apparatus according to claim 30, wherein the magnetic heads and bonding pads on one slider and the magnetic heads and bonding pads on other slider are symmetrically disposed around a space between the pair of sliders.

34. A thin film magnetic head apparatus according to claim 30, wherein the magnetic heads and first and second bonding pads on one slider and the magnetic heads and first and second bonding pads on other slider are symmetrically disposed around a space between the pair of sliders while positions of the third and fourth bonding pads with respect to the magnetic heads are exchanged around the space between the pair of sliders.

* * * * *